United States Patent
Kujak et al.

(10) Patent No.: US 11,421,924 B2
(45) Date of Patent: Aug. 23, 2022

(54) HEAT TRANSFER CIRCUIT WITH TARGETED ADDITIVE SUPPLY

(71) Applicant: TRANE INTERNATIONAL INC., Davidson, NC (US)

(72) Inventors: Stephen A. Kujak, Onalaska, MN (US); Kenneth J. Schultz, Onalaska, WI (US); Elyse M. Sorenson, Stoddard, WI (US); Morgan Elizabeth Herried Leehey, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 355 days.

(21) Appl. No.: 16/527,909

(22) Filed: Jul. 31, 2019

(65) Prior Publication Data

US 2021/0033323 A1 Feb. 4, 2021

(51) Int. Cl.
| | |
|---|---|
| *F25B 43/00* | (2006.01) |
| *C09K 5/04* | (2006.01) |
| *C09K 15/06* | (2006.01) |
| *C09K 15/18* | (2006.01) |

(52) U.S. Cl.
CPC ............ *F25B 43/00* (2013.01); *C09K 5/044* (2013.01); *C09K 15/06* (2013.01); *C09K 15/18* (2013.01); *C09K 2205/126* (2013.01); *C09K 2205/24* (2013.01); *F25B 2700/21152* (2013.01)

(58) Field of Classification Search
CPC ............ F25B 43/00; F25B 2700/21152; C09K 5/044; C09K 15/06; C09K 15/18; C09K 2205/16; C09K 2205/24
See application file for complete search history.

(56) References Cited

U.S. PATENT DOCUMENTS

| | | | |
|---|---|---|---|
| 8,449,789 B2 | 5/2013 | Kaneko et al. | |
| 9,090,806 B2 | 7/2015 | Takigawa et al. | |
| 2010/0038583 A1 | 2/2010 | Shimomura et al. | |
| 2011/0005723 A1 | 1/2011 | Mouli | |
| 2014/0209830 A1 | 7/2014 | Shimomura et al. | |
| 2018/0201817 A1 | 7/2018 | Close et al. | |
| 2020/0208882 A1* | 7/2020 | Ota | F25B 9/006 |

* cited by examiner

*Primary Examiner* — Elizabeth J Martin
(74) *Attorney, Agent, or Firm* — Hamre, Schumann, Mueller & Larson, P.C.

(57) ABSTRACT

A heat transfer circuit that includes a main flow path for a working fluid that extends through a compressor, a condenser, an expander, and an evaporator. The working fluid includes $CF_3I$. The heat transfer circuit also includes an additive stream configured to supply additive for the $CF_3I$ to the working fluid in the main flow path based on a discharge temperature of the compressor. A method for operating a heat transfer circuit that includes directing a working fluid including $CF_3I$ through a main flow path of the heat transfer circuit. The method also includes changing a concentration of additive for the $CF_3I$ based on a discharge temperature of the working fluid from the compressor.

19 Claims, 4 Drawing Sheets

HEAT TRANSFER CIRCUIT WITH TARGETED ADDITIVE SUPPLY

FIELD

This disclosure relates to heat transfer circuits and working fluids used in heat transfer circuits. More specifically, this disclosure relates to heat transfer circuits utilized in heating, ventilation, air conditioning, and refrigeration systems ("HVACR") systems.

BACKGROUND

HVACR systems are generally used to heat, cool, and/or ventilate an enclosed space (e.g., an interior space of a commercial building or a residential building, an interior space of a refrigerated transport unit, or the like). A HVACR system may include a heat transfer circuit that utilizes a working fluid to provide cooled or heated air to an area. The working fluid may include one or more refrigerants. The working fluid flows through one or more components (e.g., heat exchanger(s), compressor, expander, tanks, or the like) and connecting structures (e.g., valves, pipes, joints, or the like) of the heat transfer circuit. The working fluid contacts the material(s) of the component(s) and connecting structure(s) as it flows through the component(s) and connecting structure(s).

SUMMARY

A HVACR system can include a heat transfer circuit configured to heat and/or cool a process fluid (e.g., air, water and/or glycol, or the like). A working fluid is circulated through the heat transfer circuit. The heat transfer circuit includes a compressor to compress the working fluid. The working fluid and the process fluid separately flow through a heat exchanger. The heat exchanger may be a condenser. The heat transfer circuit includes a main flow path that extends through the compressor and the condenser.

In an embodiment, the working fluid includes $CF_3I$. The heat transfer circuit includes an additive stream configured to supply additive to the main flow path based on a discharge temperature of the working fluid from the compressor.

In an embodiment, the additive includes one or more radical reaction stabilizer(s) for $CF_3I$ and/or radical scavenger(s) for $CF_3I$. In an embodiment, the radical reaction stabilizer is triaryl phosphate and/or triaryl amine. In an embodiment, a total concentration of the radical reaction stabilizer(s) in the working fluid entering the condenser is from at or about 0.00003% to at or about 0.015% by volume. In an embodiment, a total concentration of the one or more radical scavengers in the working fluid entering the condenser is from at or about 0.000003% to at or about 0.01% by volume.

In an embodiment, the additive stream supplies the additive to the main flow path at the compressor or after the compressor and before the condenser. In an embodiment, the additive stream supplies the additive to a compression mechanism of the compressor. The additive is supplied to the main flow path before the condenser which can increase the concentration of the additive in the working fluid flowing into the condenser.

In an embodiment, a method for operating a heat transfer circuit includes directing a working fluid through a main flow path of the heat transfer circuit. The main flow path extends through the compressor, the condenser, an expander, and an evaporator of the heat transfer circuit. The method also includes changing a concentration of the additive in the working fluid entering the condenser based on a discharge temperature of the working fluid from the compressor.

In an embodiment, changing the concentration of additive in the working fluid entering the condenser includes an additive stream supplying a flow of the additive to the main flow path based on the discharge temperature. The additive supplied by the additive stream mixes with the working fluid and increases the concentration of the additive in the working fluid flowing into the condenser.

In an embodiment, the flowrate of the additive from the additive stream is at or about constant when the discharge temperature is below a predetermined temperature. In an embodiment, the flowrate of the additive from the additive stream is at or about zero when the discharge temperature is below a predetermined temperature.

BRIEF DESCRIPTION OF THE DRAWINGS

Both described and other features, aspects, and advantages of a heat transfer circuit and methods of operating a heat transfer circuit will be better understood with the following drawings.

Like reference characters refer to similar features.

DETAILED DESCRIPTION

A heating, ventilation, air conditioning, and refrigeration system ("HVACR") is generally configured to heat and/or cool an enclosed space (e.g., an interior space of a commercial building or a residential building, an interior space of a refrigerated transport unit, or the like). The HVACR system includes a heat transfer circuit to heat or cool a process fluid (e.g., air, water and/or glycol, or the like). A working fluid flows through the heat transfer circuit and is utilized to heat or cool the process fluid. The process fluid may heat and/or cool an enclosed space directly or indirectly. For example, indirect heating and/or cooling may include the working fluid heating and/or cooling an intermediate fluid (e.g., air, water and/or glycol, or the like), and then the heated/cooled intermediate fluid heating and/or cooling the process fluid.

A working fluid includes one or more refrigerants. A working fluid may also include one or more additional components. For example, an additional component may be, but is not limited to, impurities, refrigeration system additives, tracers, ultraviolet ("UV") dyes, and/or solubilizing agents.

There has been recent movement (e.g., the Kigali Amendment to the Montreal Protocol, the Paris Agreement, United States' Significant New Alternatives Policy ("SNAP")) to limit the types of refrigerants utilized in HVACR systems as concerns about environmental impact (e.g., ozone depletion, global warming impact) have increased. In particular, the movement has been to replace ozone depleting refrigerants (e.g., chlorofluorocarbons (CFCs), hydrochlorofluorocarbons (HCFCs), or the like) and high global warming potential refrigerants with refrigerants that have a lower environmental impact.

Trifluoroiodomethane ($CF_3I$) has been proposed as a non-flammable refrigerant. $CF_3I$ has a low GWP (approximately 0.4 in the Fifth Assessment Report of the Intergovernmental Panel on Climate Change) and thermodynamic properties similar to, for example, R1234ze(E) and the like. $CF_3I$ may be used by itself or in combination with other refrigerants in a working fluid.

At increased temperatures, $CF_3I$ has been found to be less stable than previous refrigerants. For example, under similar conditions, $CF_3I$ has been found to breakdown at a rate that is approximately 10,000 times greater than R22. $CF_3I$ has been found to decompose (e.g., breakdown) to produce, for example, R23 (trifluoromethane), hydrofluoric acid, and/or hydroiodic acids. For example, $CF_3I$ has found to breakdown under the following equilibrium:

Increased temperatures drive the above equilibrium to the right to form radials of $CF_3I$ ($CF_3^+$, $I^-$). The $CF_3^+$ radical has also been found to also further breakdown into $CF_2^{+2}$ under the following equilibrium:

This equilibrium is also driven to the right by increased temperatures to form radicals of $CF_3^+$ ($CF_2^{+2}$, $F^-$). The iodine ($I^-$) and fluorine ($F^-$) radials can extract hydrogen atoms from system materials to form hydroiodic acid (HI) and hydrofluoric acid (HF), respectively. In an embodiment, system materials may include polymers (e.g., elastomers or the like) in the heat transfer circuit (e.g., gaskets, motor materials, or the like), lubricant, and/or other refrigerants. The fluoric radials ($CF_2^{+2}$, $CF_3^+$) can also react to form R23 ($CF_3H$). The production of R23 can significantly impact the GWP of the working fluid as R23 has a large GWP (approximately 12,400 in the Fifth Assessment Report of the Intergovernmental Panel on Climate Change).

When $CF_3I$ is included in a working fluid in a heat transfer circuit, the formed hydrofluoric acid and/or hydroiodic acid can corrode metals in the heat transfer circuit and compromise the efficiency and/or reliability of the heat transfer circuit. In an embodiment, the heat transfer circuit can be formed of metals such as, but is not limited to, iron, copper, aluminum, tin, braze alloys including silver, and/or zinc which can be more easily corroded by these acids. In an embodiment, joints that connect the different components of the heat transfer circuit (e.g., compressor, condenser, expander, evaporator, etc.) to the main flow path may comprise one of more of these metals. It has been found that when the working fluid does not reach higher temperatures, the hydrofluoric acid and hydroiodic acid are not formed in concentrations that cause significant corrosion of the metal(s) in the heat transfer circuit. The corrosion being significant when it noticeably impacts the overall efficiency of the heat transfer circuit or the reliability of the materials in the heat transfer circuit.

Embodiments disclosed are to a heat transfer circuit, and methods of operating a heat transfer circuit, that utilize an additive for $CF_3I$ to address possible metal corrosion in a targeted manner that lessens the efficiency impact caused by inclusion of the additive(s).

Figure 1:
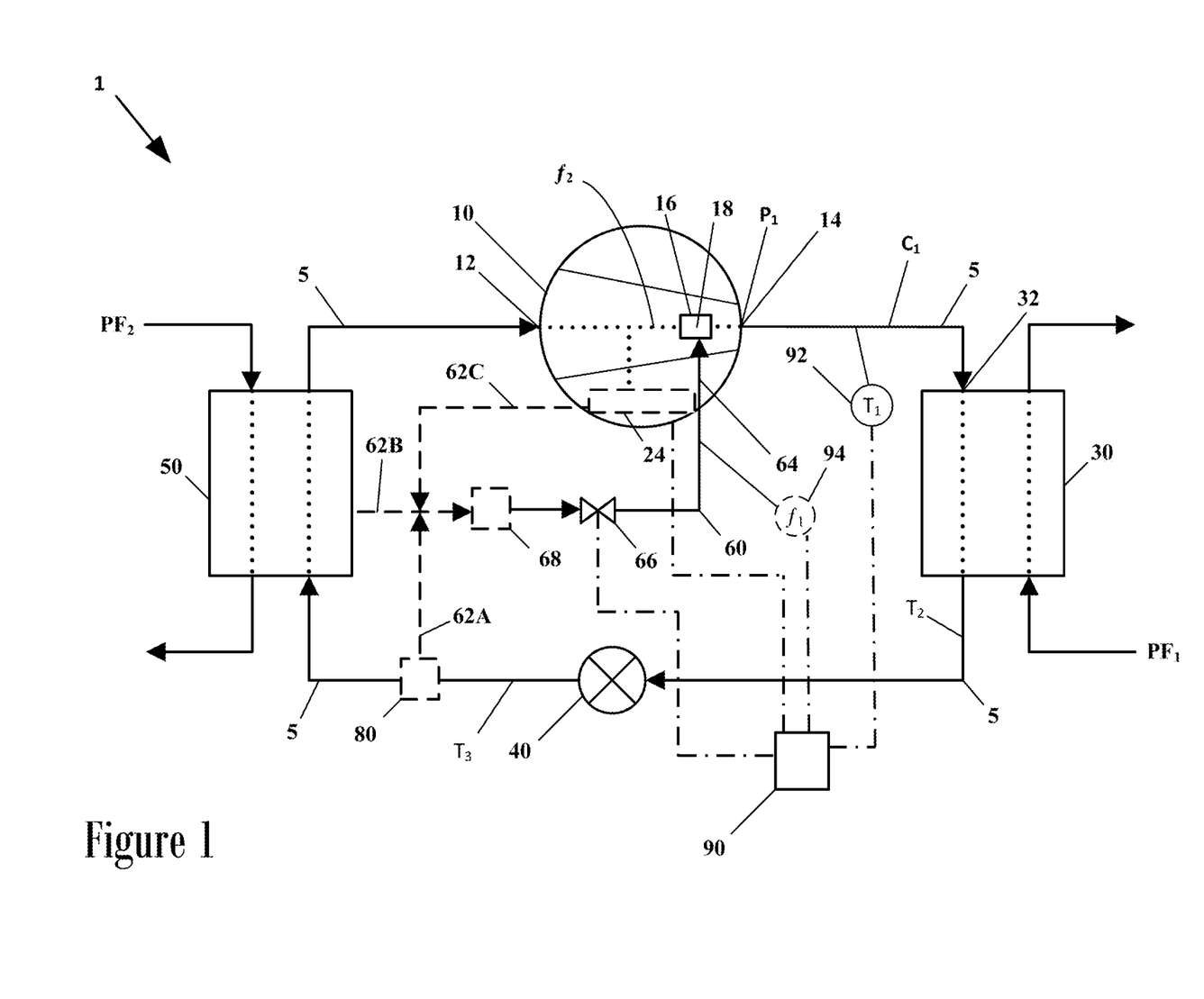
FIG. 1 is a schematic diagram of an embodiment of a heat transfer circuit.

FIG. 1 is a schematic diagram of an embodiment of a heat transfer circuit 1. In an embodiment, the heat transfer circuit 1 is utilized in a HVACR system. The heat transfer circuit 1 includes a compressor 10, a condenser 30, an expansion device 40, and an evaporator 50. In an embodiment, the heat transfer circuit 1 can be modified to include additional components, such as, for example, an economizer heat exchanger, one or more valve(s), sensor(s) (e.g., a flow sensor, a temperature sensor), a receiver tank, or the like.

The components of the heat transfer circuit 1 are fluidly connected. The heat transfer circuit 1 can be configured as a cooling system that can be operated in a cooling mode (e.g., a fluid chiller of an HVACR system, an air conditioning system, or the like), or the heat transfer circuit 1 may be configured as a heat pump system that can be run in a cooling mode or a heating mode.

A working fluid flows through the heat transfer circuit 1. The main flow path 5 of the working fluid through the heat transfer circuit 1 extends through the compressor 10, the condenser 30, the expansion device 40, the evaporator 50, and back to the compressor 10. In an embodiment, the main flow path 5 extends from a discharge outlet 14 of the compressor 10 back to a suction inlet 12 of the compressor 10, and through the compressor 10 from the suction inlet 12 to the discharge outlet 14. The working fluid includes $CF_3I$. In an embodiment, the working fluid includes $CF_3I$ and one or more low GWP refrigerants.

Dotted lines are provided in the Figures to indicate fluid flows through some components (e.g., compressor 10, condenser 30, evaporator 50) for clarity, and should be understood as not specifying a specific route in each component. Dashed dotted lines are provided in the Figures to illustrate electronic communications between different features. For example, a dashed dotted line extends from a controller 90 to a temperature sensor 92 as the controller 90 receives measurements (e.g., temperature measurements) from the temperature sensor 92. For example, a dashed-dotted line extends from the controller 90 to the compressor 10 as the controller 10 controls the compressor 10. In an embodiment, the controller 90 includes memory (not shown) for storing information and a processor (not shown). The controller 90 in FIG. 1 and described below is described/shown as a single component. However, it should be appreciated that a "controller" as shown in the Figures and described herein may include multiple discrete or interconnected components that include a memory (not shown) and a processor (not shown) in an embodiment.

Working fluid in a lower pressure gaseous state or mostly gaseous state is drawn into the suction inlet 12 of the compressor 10. The working fluid is compressed as it flows through the compressor 10 from the suction inlet 12 to the discharge outlet 14 of the compressor 10. Higher pressure ($P_1$) gaseous or mostly gaseous working fluid is discharged from the discharge outlet 14 of the compressor 10.

In an embodiment, the compressor 10 is a centrifugal compressor, a screw compressor, a scroll compressor, a rotary vane pump, or a reciprocating pump. The compressor 10 includes a compression mechanism 16 that is at least partially rotated or orbited within the compressor 10 to compress working fluid. A compression pocket 18 is formed by the compression mechanism 16.

In an embodiment, a centrifugal compressor utilizes a series rotating blades (not shown) connected to a shaft (not shown) and/or plate (not shown) to compress a gas. In an embodiment, gas is introduced to an outer radius of the blades as the shaft and/or plate is rotated. As the blades are rotated, gas is suctioned radially inwards and is then discharged in the axial direction. The blades rotate at speeds that result in the suctioned gas being compressed as it flows radially inward. Accordingly, the compressed gas is discharged in the axial direction. In another embodiment, gas is supplied along the axis of the shaft and/or plate, and the rotating blades compress the gas by forcing the gas to flow radially outward. Accordingly, the compressed gas is discharged in the radial direction. In such embodiments, the compression mechanism 16 is the rotating blades and a compression pocket 18 is a space formed between the rotating blades in which the gas in compressed.

In an embodiment, a screw compressor utilizes meshed screws (not shown) in which one or more of the meshed screws is rotated to compress a gas. In an embodiment, gas is introduced to an end or side of the meshed screws and is compressed between the meshed screws as the meshed screw(s) are rotated. The gas is then discharged from a second end of the meshed screws from a side or end of the screws. In such an embodiment, the compression mechanism 16 is the meshed screws and a pressure pocket 18 is space between the meshed screws in which gas is trapped and compressed.

In an embodiment, a scroll compressor utilizes at least one pair of intermeshed scrolls (not shown) in which one or both of the scrolls is rotated relative to the other to compress a gas. In an embodiment, gas is introduced to an outer circumference or inner circumference of the meshed scrolls and is suctioned into and trapped in pockets between the intermeshed scrolls. As the intermeshed scrolls rotate relative to teach other, each of the pockets moves along the intermeshed scrolls and becomes smaller, which compresses the gas trapped in each pocket. The pocket then reaches an opening and compressed gas is discharged from between the intermeshed scrolls. In such an embodiment, the compression mechanism 16 is the intermeshed scrolls and a pressure pocket 18 is one of the pockets between the intermeshed scrolls in which gas is trapped and compressed.

In an embodiment, a rotary vane pump utilizes a rotor that rotates within a cavity. One or more vanes extend from the rotor and contact move to contact the wall of the cavity. The vanes define pockets within the cavity that are enlarged then reduced to suction gas and compress gas. In such an embodiment, the compression mechanism 16 is the wall of the cavity and the rotor, and the pressure pocket 18 is one of the pockets formed by the wall of the cavity and one or more of the vanes.

In an embodiment, reciprocating pump utilizes a piston or plunger that moves within a cavity. The plunger or piston moves in a first direction within the cavity to form a pocket in the cavity, and moves in the opposite direction to compressor fluid within the pocket. In an embodiment, a check valve prevents fluid from leaving the pocket before being compressed to a desired degree. In such an embodiment, the compression mechanism 16 is the cavity and the plunger or piston, and the pressure pocket 18 is the pocket formed by the cavity and the plunger and/or piston.

Compression of the working fluid also causes an increase in its temperature. Thus, the compression of the working fluid by the compressor 10 increases both the pressure and the temperature of the working fluid. Accordingly, the compressed working fluid at the discharge outlet 14 of the compressor 10 also has an increased temperature $T_1$ (relative to the temperature of working fluid at the suction inlet 12 of the compressor). The working fluid flows from the discharge outlet 14 of the compressor 10 through the main flow path 5 to the condenser 30.

A first process fluid $PF_1$ flows through the condenser 30 separate from the working fluid. The condenser 30 is a heat exchanger that allows the working fluid and the first process fluid $PF_1$ to be in a heat transfer relationship without physically mixing as they each flow through the condenser 30. As the working fluid flows through the condenser 30, the working fluid is cooled by the first process fluid $PF_1$. Accordingly, the first process fluid $PF_1$ is heated by the working fluid and exits the condenser 30 at a higher temperature relative to temperature at which it entered the condenser 30. In an embodiment, the first process fluid $PF_1$ may be air, water and/or glycol, or the like that is suitable for absorbing and transferring heat from the working fluid and the heat transfer circuit 1. For example, the first process fluid $PF_1$ may be ambient air circulated from an outside atmosphere, water to be heated as hot water, or any suitable fluid for transferring heat from the heat transfer circuit 1. The working fluid is cooled to a lower temperature $T_2$ by the condenser 20 and becomes liquid or mostly liquid as it is cooled in the condenser 30.

The liquid/gaseous working fluid flows from the condenser 30 to the expansion device 40. The expansion device 40 allows the working fluid to expand. The expansion causes the working fluid to significantly decrease in temperature. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in temperature. The gaseous/liquid working fluid has a lower temperature $T_3$ after being expanded by the expansion device 40.

The lower temperature gaseous/liquid working fluid then flows from the expansion device 40 to and through the evaporator 50. A second process fluid $PF_2$ also flows through the evaporator 50 separately from the working fluid. The evaporator 50 is a heat exchanger that allows the working fluid and the second process fluid $PF_2$ to be in a heat transfer relationship within the evaporator 50 without physically mixing. As the working fluid and the second process fluid $PF_2$ flow through the evaporator 50, the working fluid absorbs heat from the second process fluid $PF_2$ which cools the second process fluid $PF_2$. Accordingly, the second process fluid $PF_2$ exits the evaporator 50 at a lower temperature than the temperature at which it entered the evaporator 50. The working fluid is gaseous or mostly gaseous as it exits the evaporator 50. The working fluid flows from the evaporator 50 to the suction inlet 12 of the compressor 10.

In an embodiment, the second process fluid $PF_2$ is air cooled by the HVACR system and ventilated to the enclosed space to be conditioned. In an embodiment, the second process fluid $PF_2$ is an intermediate fluid (e.g., water, heat transfer fluid, or the like), and the cooled second process fluid $PF_2$ may be utilized by the HVACR system to cool air in or ventilated to the enclosed space to be conditioned.

As discussed above, the expansion of the working fluid by the expander 40 causes a significant temperature decrease ($T_3-T_2$) of the working fluid. This temperature decrease becomes greater as the amount of expansion increases (e.g., as the pressure drop across the expander 40 becomes greater). To provide greater cooling for the second process fluid $PF_2$, the compressor 10 can be operated to discharge compressed working fluid with a greater discharge pressure $P_1$. The greater discharge pressure $P_1$ allowing for a greater expansion of the working fluid in the expander 40 and a greater temperature decrease, which allows for more cooling of the second process fluid $PF_2$. As the working fluid is compressed by a greater degree in the compressor 10, the greater amount of compression causes a greater increase in the temperature of the working fluid.

The working fluid in the heat transfer circuit 1 includes $CF_3I$. In an embodiment, the working fluid may include the $CF_3I$ and one or more other refrigerant(s). For example, the one or more other refrigerant(s) may include, but is not limited to, HFOs [e.g., R1234yf, R1336mzz (e.g., R1336mzz(E)), R1123, R1132a, R1132 (e.g., R1132(Z), R1132(E)), R1234ze (e.g., R1234ze(E)), or the like], HFCs (e.g., R134a, R125 or the like), low GWP HFCs (e.g., R152a), R744, and/or R290. In an embodiment, the working fluid may include from at or about 3% to at or about 75% of $CF_3I$ by weight. In an embodiment, the working fluid may include more than 20% by weight of $CF_3I$.

In an embodiment, the working fluid also includes a lubricant and an additive for the $CF_3I$. The additive can include one or more radical reaction stabilizers for $CF_3I$ and/or radical scavengers for $CF_3I$. In an embodiment, the additive includes one or more reaction stabilizers for $CF_3I$. In an embodiment, the additive includes one or more radical scavengers for $CF_3I$. In an embodiment, the additive includes a blend of the radical stabilizers for $CF_3I$ and the radical scavengers for $CF_3I$. In an embodiment, the additive may be a single reaction stabilizer or radical scavenger for $CF_3I$.

A radical stabilizer promotes stabilization of the radial breakdown equilibrium of the $CF_3I$. A radical stabilizer can allow the formed free radicals ($CF_3^+$, $CF_2^{+2}$, $I^-$, $F^-$) to reform $CF_3I$ without further reactions. In an embodiment, the radical reaction stabilizer includes one or more triaryl phosphates, triaryl amines, phosphate esters, thiophosphate esters, metal thiophosphates, phosphorous containing ionic liquids, and/or sulfur containing ionic liquids. In an embodiment, phosphorous containing ionic liquids include organo phosphorous compounds that including at least one of a phosphonium ion ($P^{-3}$), a phosphite ion ($P^{+3}$), and/or a phosphate ion ($P^{+5}$)). In an embodiment, sulfur containing ionic liquids include organo sulfur compounds containing at least one sulfur ion. In an embodiment, the metal thiophosphates may be, but is not limited to, one or more zinc dithiophosphates. In an embodiment, a radical reaction stabilizer includes one or more triaryl phosphates and/or triaryl amines. In an embodiment, a triaryl phosphate may be, but is not limited to, tricresyl phosphate ("TCP") and/or trinaphthyl phosphate. In an embodiment, a triaryl amine may be, but is not limited to, tricresyl amine and/or trinaphthyl amine. In an embodiment, both phosphorous and sulfur have been found to be attracted to metals in the heat transfer circuit 1 that can be more easily corroded by the acids formed from the $CF_3I$. This attraction can advantageously cause, for example, the triaryl phosphates and/or triaryl amines to have a higher concentration at the surface(s) of said metals and reduce the concentration of these acids along said metal surface(s). In an embodiment, a total amount of the radical reaction stabilizer(s) in the lubricant is from at or about 2% to at or about 3% by volume.

A radical scavenger is a compound capable of acting as a proton donor for the free radical(s) of $CF_3I$ or an acid acceptor for the free radial(s) of $CF_3I$ to form a generally unreactive product(s). In an embodiment, a proton donor radical scavenger for $CF_3I$ may be, but is not limited to, butylated hydroxytoluene ("BHT"), a vitamin, isoprene (2-methyl-1,3 butadiene), acetaldehyde, dimethyl hydrazone, 2-pentene, 1-hexene, 2-hexene, a conjugated unsaturant (e.g., a diene, isobuylene, a faresene, or the like), and/or a double bonded radical scavenger (e.g., p-hydrotoluene, hydroquinone, dibutyl hydroquinone, or the like). In an embodiment, a vitamin may be alpha tocopherol (vitamin E), ascorbic acid (vitamin C), and/or beta carotene (vitamin A). In an embodiment, an acid accepter radical scavenger may be a dioxane (e.g., 1,4-dioxane), trimethyl oxymethane, ethyl acetate, and/or an epoxide (e.g., butylene oxide, or the like). In an embodiment, a total amount of radical scavenger(s) in the lubricant is from at or about 0.001% to at or about 0.2% by volume. In an embodiment, the total amount of radical scavenger(s) in the lubricant may be from at or about 0.001% to at or about 0.05% by volume. In an embodiment, the total amount of radical scavenger(s) in the lubricant may be from at or about 0.005% to at or about 0.05% by volume.

The heat transfer circuit 1 also includes an additive stream 60. In an embodiment, the additive stream 60 is connected to the main flow path 5 at the compressor 10 as shown in FIG. 1. The additive stream 60 increases the concentration of additive $C_1$ in the working fluid in the main flow path 5 entering the inlet 32 of the condenser 30. In an embodiment, the lubricant contains the additive, and the additive stream 60 increases the concentration of additive $C_1$ by increasing the concentration of lubricant in the working fluid. In an embodiment, the additive stream 60 includes inlets 62A, 62B, 62C, an outlet 64, and a valve 66. The additive stream 60 is configured to supply additive to the main flow path 5.

In an embodiment, most of the lubricant remains liquid throughout the heat transfer circuit 1. It should be appreciated that refrigerant may be dissolved in liquid lubricant, and/or minor amounts of additive may be contained in the gaseous refrigerant in the working fluid. The liquid additive is separated from the gaseous refrigerant before the gaseous refrigerant enters the compression mechanism 16 of the compressor 10. In an embodiment, lubricant containing the additive may be separated by the compressor 10, by the evaporator 50, and/or by an optional separator 80.

In an embodiment, the compressor 10 includes an optional sump 24 and lubricant containing the additive is separated in the compressor 10. In an embodiment, the working fluid enters the suction inlet 12 of the compressor 10 and contains both a gaseous portion and a liquid portion. For example, the gaseous portion is mostly refrigerant and the liquid portion being mostly lubricant and/or additive. After entering the suction inlet 12, the liquid portion falls into the sump 24 while the gaseous portion continues to the compression mechanism 18 of the compressor 10. Thus, the gaseous portion which includes most of the refrigerant(s) of the working fluid flows into the compression mechanism 18, while the liquid portion goes into the sump 24. In an embodiment, the additive stream 60 includes an inlet 62C that is connected to the sump 24. The liquid lubricant flows from the sump 24 into the inlet 62C of the additive stream 60.

In an embodiment, lubricant containing the additive may be separated within the evaporator 50. In an embodiment, the evaporator 50 may be a flooded evaporator in which the liquid in the working fluid pools in evaporator 50. The additive stream 60 includes an inlet 62B connected to the evaporator 50. The liquid in the evaporator 50 flows into the inlet 62B of the additive stream 60. In an embodiment, the separated liquid in the evaporator 50 is liquid lubricant containing the additive.

In an embodiment, the heat transfer circuit 1 may include an optional separator 80 for separating lubricant containing the additive. The separator 80 is located after the expansion device 40 and before the compressor 10 in the main flow path 5. The separator 80 is a liquid/gas separator is configured to separate at least a portion of the liquid of the working fluid. As shown in FIG. 1, the separator 80 in an embodiment is located in the main flow path 5 between the expansion device 40 and the evaporator 50. In an embodiment, the additive stream 60 includes an inlet 62A connected to the separator 80, and separated liquid flows from the separator 80 into the inlet 62A of the additive stream 60. In an embodiment, the working fluid after the expansion device 40 is in a mixed phase. The lubricant has a higher vaporization temperature than the refrigerant(s). More of the refrigerant(s) in the working fluid is gaseous than liquid in the mixed phase such that the liquid portion of the working fluid has a higher concentration of lubricant than the working fluid as a whole. The non-separated gaseous or mixed phase working fluid continues from the separator 80 through the main flow path 5 to the evaporator 50. In an embodiment, after being expanded by the expander 40, the refrigerant(s) in the expanded working fluid may be in a mixed phase while the lubricant containing additive is in a liquid phase. Therefore, the liquid portion of the working fluid after the expander 40 has a higher concentration of additive than the working fluid as a whole. Thus, the separated liquid that flows into the inlet 62A may have a higher concentration of fluid than the working fluid exiting the expander 40.

In FIG. 1, the separator 80 is located in the main flow path 5 between the expansion device 40 and the evaporator 50. However, the separator 80 in an embodiment may be located in the main flow path 5 between the evaporator 50 and the compressor 10. In such an embodiment, the separator 80 is configured to separate liquid from the working fluid discharged from the evaporator 50, and the gaseous working fluid continues through the main flow path 5 to the suction inlet 12 of the compressor 10. In an embodiment, the separated liquid includes liquid lubricant containing the additive.

The additive stream 60 includes three inlets 62A, 62B, 62C. However, it should be appreciated that the additive stream 60 in an embodiment may include one or more inlets 62A, 62B, 62C. In an embodiment, the additive stream 60 may include a single inlet 62A, 62B, 62C connected to one of the separator 80, the evaporator 50, or the sump 24 that is configured to separate the liquid from the working fluid.

In an embodiment, the additive stream 60 may include an optional holding tank 68 for holding separated liquid. The separated liquid may be held within the holding tank 68 until being supplied through the outlet 64 of the lubricant stream 60.

The additive stream 60 is configured to supply a flowrate of liquid including the additive $f_1$ to the main flow path 5. The additive is supplied to the main flow path 5 to adjust the concentration of additive in the working fluid downstream of the compressor 10. The flowrate of liquid including the additive $f_1$ supplied by the additive stream 60 includes additive. The additive stream 60 is configured to control a concentration of additive $C_1$ flowing through the main flow path 5 of the heat transfer circuit 1. In an embodiment, the additive stream 60 supplies a flow of lubricant containing additive to the main flow path 5, which adjusts the concentration of additive $C_1$ in the main flow path 5 by adjusting the concentration of lubricant containing the additive in the main flow path 5. In an embodiment, the concentration of lubricant in the working fluid is the concentration of additive $C_1$ in the working fluid entering the condenser 30. In an embodiment, the concentration of additive $C_1$ in the working fluid is the concentration of additive $C_1$ in the working fluid exiting the discharge outlet 14 of the compressor 10.

In an embodiment, the flowrate of liquid including the additive $f_1$ supplied from the additive stream 60 is based on a discharge temperature $T_1$ of the working fluid from the discharge outlet 14 of the compressor 10. In an embodiment, the flowrate of liquid including the additive $f_1$ is a first flowrate when the discharge temperature $T_1$ is below a predetermined temperature. The flowrate of liquid including the additive $f_1$ is increased to a second flowrate when the discharge temperature $T_1$ is equal to the predetermined temperature. Accordingly, the concentration of additive $C_1$ is increased when the discharge temperature $T_1$ reaches the predetermined temperature. In an embodiment, the flowrate of liquid including the additive $f_1$ of lubricant containing additive may be 0.1% to 3.0% by volume of the total flowrate of working fluid flowing through the condenser 30.

In an embodiment, the predetermined temperature is based on the temperature at which the breakdown of $CF_3I$ begins to breakdown significantly. $CF_3I$ is considered to "breakdown significantly" when the breaks down occurs at a rate that causes a noticeable impact to the overall efficiency of the heat transfer circuit 1 or the stability of its metallic components. In an embodiment, the predetermined temperature is the temperature at which the $CF_3I$ breaks down at 1 ppm per day. In an embodiment, the predetermined temperature is less than 90° C. In an embodiment, the predetermined temperature is greater than 50° C. In an embodiment, the predetermined temperature is at or about 80° C. or less than 80° C. In an embodiment, the predetermined temperature is at or about 60° C. or greater than 60° C. In an embodiment, the predetermined temperature is from at or about 60° C. to at or about 80° C. In an embodiment, the predetermined temperature is at or about 60° C. to at or about 70° C.

In an embodiment, the first flowrate may be at or about zero. In an embodiment, at or about zero may include a minimal flowrate that is caused by leakage through the additive stream 60. The additive stream 60 in an embodiment may be configured to not provide any additional flowrate of additive when the discharge temperature $T_1$ is below the predetermined temperature. In an embodiment, additional additive may not be desired when the discharge temperature $T_1$ is below a temperature at which $CF_3I$ begins to breakdown significantly.

In an embodiment, the concentration of additive $C_1$ in the working fluid at the inlet 32 of the condenser 30 is less than 0.3% by volume when the discharge temperature $T_1$ is below the predetermined temperature. In an embodiment, the concentration of additive $C_1$ in the working fluid at the inlet 32 of the condenser 30 is less than 0.1% by volume when the discharge temperature $T_1$ is below the predetermined temperature. In an embodiment, the flowrate of liquid including the additive $f_1$ is changed to a second flowrate when the discharge temperature $T_1$ reaches the predetermined temperature. In an embodiment, the second flowrate results in the concentration of additive $C_1$ in the working fluid at the inlet 32 of the condenser 30 being at least from at or about 0.3% to at or about 0.5% by volume. In an embodiment, the flowrate of liquid including the additive $f_1$ increases from the second flowrate as the discharge temperature $T_1$ increases. In an embodiment, the working fluid entering the compression mechanism 18 (see at $f_2$) has a lower concentration of additive than the working fluid entering the inlet 32 of the condenser 30.

In an embodiment, the maximum concentration of lubricant in the working fluid entering the inlet 32 of the condenser 30 is at or about 5% or less than 5% by volume. In an embodiment, the maximum concentration of lubricant in the working fluid entering the inlet 32 of the condenser 30 is at or about 3% or less than 3% by volume. In an embodiment, the working fluid at the inlet 32 of the condenser 30 has less than 0.3% by volume of lubricant when the discharge temperature is $T_1$ is below the predetermined temperature. In an embodiment, the working fluid at the inlet 32 of the condenser 30 has less than 0.2% by volume of lubricant when the discharge temperature is $T_1$ is below the predetermined temperature. In an embodiment, the working fluid at the inlet 32 of the condenser 30 has less than 0.1% by volume of lubricant when the discharge temperature is $T_1$ is below the predetermined temperature. In an embodiment, the working fluid $f_2$ entering the compression mechanism 18 has a lower concentration of lubricant than the working fluid entering the inlet 32 of the condenser 30.

Thus, the total concentration of the radical reaction stabilizer(s) in the working fluid entering the inlet 32 of the condenser 30 in an embodiment may be from at or about 0.00003% to at or about 0.015% by volume. In an embodiment, the total concentration of the radical reaction stabilizer(s) in the working fluid entering the inlet 32 of the condenser 30 may be less than 0.015% by volume. The total concentration of the radical scavenger(s) in the working fluid entering the inlet 32 of the condenser 30 in an embodiment may be from at or about 0.000003% to at or about 0.01% by volume. In an embodiment, the total concentration of the radical scavenger(s) in the working fluid entering the inlet 32 of the condenser 30 may be less than 0.01% by volume.

As discussed above, the breakdown of the $CF_3I$ becomes significant when the $CF_3I$ heated to higher elevated temperatures. In an embodiment, an increased flowrate of liquid including the additive $f_1$ supplied by the additive stream 60 also cools the working fluid and reduces the discharge temperature $T_1$ of the working fluid. In an embodiment, the flowrate of liquid including the additive $f_1$ supplied by the additive stream 60 includes lubricant containing the additive and can also help reduce the discharge temperature $T_1$ that causes the increased breakdown of the $CF_3I$.

In an embodiment, the additive stream 60 connects to the main flow path 5 at the pressure pocket 18 in the compressor 10. As shown in FIG. 1, the outlet 64 of the additive stream 60 in an embodiment supplies the flowrate of liquid including the additive $f_1$ to the pressure pocket 18. For example, in an embodiment the compressor 10 may be a scroll compressor and the liquid may be supplied from the outlet 64 of the additive stream 60 to a pressure pocket 18 through an opening in one of the intermeshed scrolls of the scroll compressor. In an embodiment, the additive stream 60 may connect to the main flow path 5 at a different location than show in FIG. 1. In an embodiment, the additive stream 60 may connect to the main flow path 5 at or after the compression mechanism 18 and before the condenser 30.

In an embodiment, the additive stream 60 includes a valve 66. The valve 66 is configured to control the flowrate of liquid including the additive $f_1$ supplied from the outlet 62 of the additive stream 60. In an embodiment, the valve 66 may be a throttling valve. In an embodiment, the additive stream 60 may include other components than those shown in FIG. 1. In an embodiment, the additive stream 60 may include additional components (e.g., a pump, or the like) and/or connections to help pressurize the additive stream 60 for supplying the flowrate of liquid including the additive $f_1$ to the main flow path 5 at or after the compression component 16.

The heat transfer circuit includes the controller 90. In an embodiment, the controller 90 is the controller of the HVACR system that includes the heat transfer circuit 1. In an embodiment, the controller 90 is electrically connected to the compressor 10 and controls operation of the compressor 10. In an embodiment, the controller 90 is connected to the valve 66 and a temperature sensor 92 that detects the discharge temperature $T_1$ of the working fluid from the discharge outlet 14 of the compressor 10. In an embodiment, the controller 90 may be connected to an optional flow sensor 94 that detects the flowrate of liquid including the additive $f_1$ supplied from the additive stream 60. In an embodiment, the controller 90 controls the flowrate $f_1$ from the additive stream 60 based on the discharge temperature $T_1$ as discussed above. In an embodiment, the controller 90 controls the valve 66 to change the flowrate of liquid including the additive $f_1$ supplied from the additive stream 60 to the main flow path 5.

As discussed above, a liquid lubricant containing the additive for the $CF_3I$ may be supplied from the additive stream 60. However, the heat transfer circuit 1 in an embodiment may be oil-free where the working fluid can also act as the lubricant. In such an embodiment, the liquid separated from the working fluid may contain liquid additive (and not oil) and the additive stream 60 is configured to supply a flowrate of liquid including the additive $f_1$ to the main flow path 5 based on the discharge temperature $T_1$.

Figure 2:
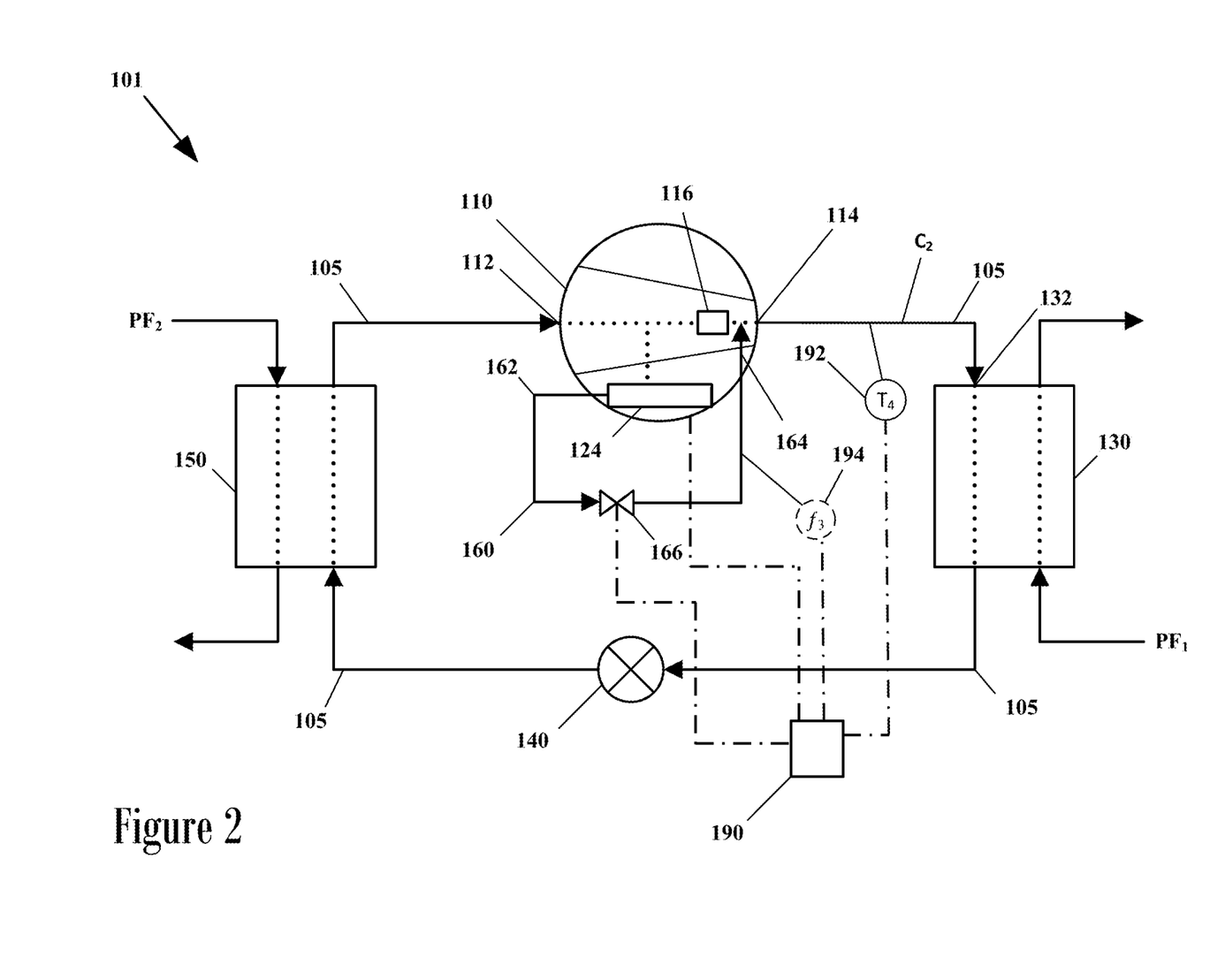
FIG. 2 is a schematic diagram of an embodiment of a heat transfer circuit.

FIG. 2 is a schematic diagram of a heat transfer circuit 101 according to an embodiment. In an embodiment, the heat transfer circuit 101 may be employed in an HVACR system. The heat transfer circuit 101 is similar to the heat transfer circuit 1 in FIG. 1, except with respect to the configuration of the additive stream 160. For example, the heat transfer circuit 101 includes a main flow path 105, a compressor 110 with a suction inlet 112, a discharge outlet 114, a compression mechanism 116, and a sump 124; a condenser 130 with an inlet 132 for the working fluid; an expansion device 140; and an evaporator 150. The condenser 130 utilizes a first process fluid $PF_1$ to cool working fluid flowing through the condenser 130, and the evaporator 150 utilizes the working fluid flowing through the evaporator 150 to cool a second process fluid $PF_2$ similar to the heat transfer circuit 1 in FIG. 1. As similarly discussed regarding the heat transfer circuit 1 in FIG. 1, the heat transfer circuit 101 in an embodiment may include additional components than those shown in FIG. 2. In an embodiment, the working fluid flowing through the heat transfer circuit 101 may have a similar composition as discussed above with respect to the heat transfer circuit 1 in FIG. 1.

As shown in FIG. 2, the additive stream 160 includes an inlet 162, an outlet 164, and a valve 166. In an embodiment, the inlet 162 of the additive stream 160 connects to the sump 124 of the compressor 110. Liquid is separated from the working fluid and flows from the sump 124 into inlet 162 of the additive stream 160. In an embodiment, the separated liquid may include lubricant that contains additive as discussed above with respect to the heat transfer circuit 1. Alternatively, the heat transfer circuit 101 may be oil-free and the separated liquid may contain liquid additive (and not oil) as similarly discussed above with respect to the heat transfer circuit 1. In such an embodiment, the additive may have a composition as discussed above.

In FIG. 2, the additive stream 160 has an inlet 162 connected to the sump 124 of the compressor 110. However, as similarly discussed above with respect to the heat transfer circuit 1 in FIG. 1, separation of the liquid for the additive stream 160 may occur in a different component in the main flow path 105 (e.g., the evaporator 150, an optional separator, etc.) in an embodiment. As similarly discussed above with respect to the additive stream 60 in FIG. 1, the additive stream 160 in an embodiment may have its inlet 162 connected to the evaporator 150 or a separator (e.g., separator 80 in FIG. 1) located after the expansion device 140 and before the compressor 110 in the main flow path 105. In such embodiments, lubricant containing additive or additive flows into the lubricant stream 160 from the evaporator 150 or the separator.

The additive stream 160 supplies additive to the main flow path 105 in the heat transfer circuit 101. The additive stream 160 providing additive to the main flow path 105, which changes the concentration of the additive $C_2$ in the working fluid downstream. The additive stream 160 is configured to control a concentration of additive $C_2$ in the working fluid flowing through the main flow path 105 as similarly discussed above with respect to the additive stream 60 in FIG. 1. In an embodiment, the concentration of additive $C_2$ in the working fluid is the concentration of additive $C_2$ in the working fluid entering the condenser 130. In an embodiment, the concentration of additive $C_2$ in the working fluid may be the concentration of additive $C_2$ in the working fluid exiting the discharge outlet 114 of the compressor 110.

As shown in FIG. 2, the outlet 164 of the additive stream 160 is connected to main flow path 105 after the compression mechanism 116 and before the discharge outlet 114 of the compressor 110. The additive stream 160 is configured to supply a flowrate of liquid including additive $f_3$ to the main flow path 105. The flowrate of liquid including the additive $f_3$ supplies additive to the working fluid in the main flow path 105 after being compressed by the compression mechanism 116 and before being discharged from the compressor 110 through the discharge outlet 114. The working fluid discharged from the compressor 110 through the outlet 114 has a discharge temperature $T_4$. In an embodiment, the flowrate of liquid including the additive $f_3$ supplied from the additive stream 160 is determined based on a discharge temperature $T_4$ of the working fluid from the compressor 110 as similarly discussed above regarding the flowrate of liquid including the additive $f_1$ in FIG. 1. In an embodiment, the working fluid flowing through the heat transfer circuit 201 may have a similar composition as discussed above with respect to the heat transfer circuit 1 in FIG. 1.

In an embodiment, the additive stream 160 includes a valve 166 configured to control the flowrate of liquid including the additive $f_3$ supplied from the outlet 164 of the additive stream 160. In an embodiment, the valve 166 may be a throttling valve. In an embodiment, the additive stream 160 may include other components than those shown in FIG. 2. In an embodiment, the additive stream 160 may include additional components (e.g., a pump, or the like) and/or connections to help pressurize the additive stream 160 for supplying the flowrate of liquid including the additive $f_3$ to the main flow path 105 after the compression component 116.

The heat transfer circuit 101 includes a controller 190. In an embodiment, the controller 190 is the controller of the HVACR system that includes the heat transfer circuit 101. In an embodiment, the controller 190 is electrically connected to compressor 110 and controls operation of the compressor 110. In an embodiment, the controller 190 is connected to the valve 166 and a temperature sensor 192 that detects the discharge temperature $T_4$ of the working fluid from the outlet 114 of the compressor 110. In an embodiment, the controller 190 may be connected to an optional flow sensor 194 that detects the flowrate of liquid including the additive $f_3$ supplied from the additive stream 160. In an embodiment, the controller 190 controls the flowrate of liquid including the additive $f_3$ from the additive stream 160 based on the discharge temperature $T_4$ as similarly discussed above with respect to the additive stream 60 in FIG. 1. In an embodiment, the controller 190 controls the valve 166 to change the flowrate of liquid including the additive $f_3$ supplied from the additive stream 160 to the main flow path 105.

Figure 3:
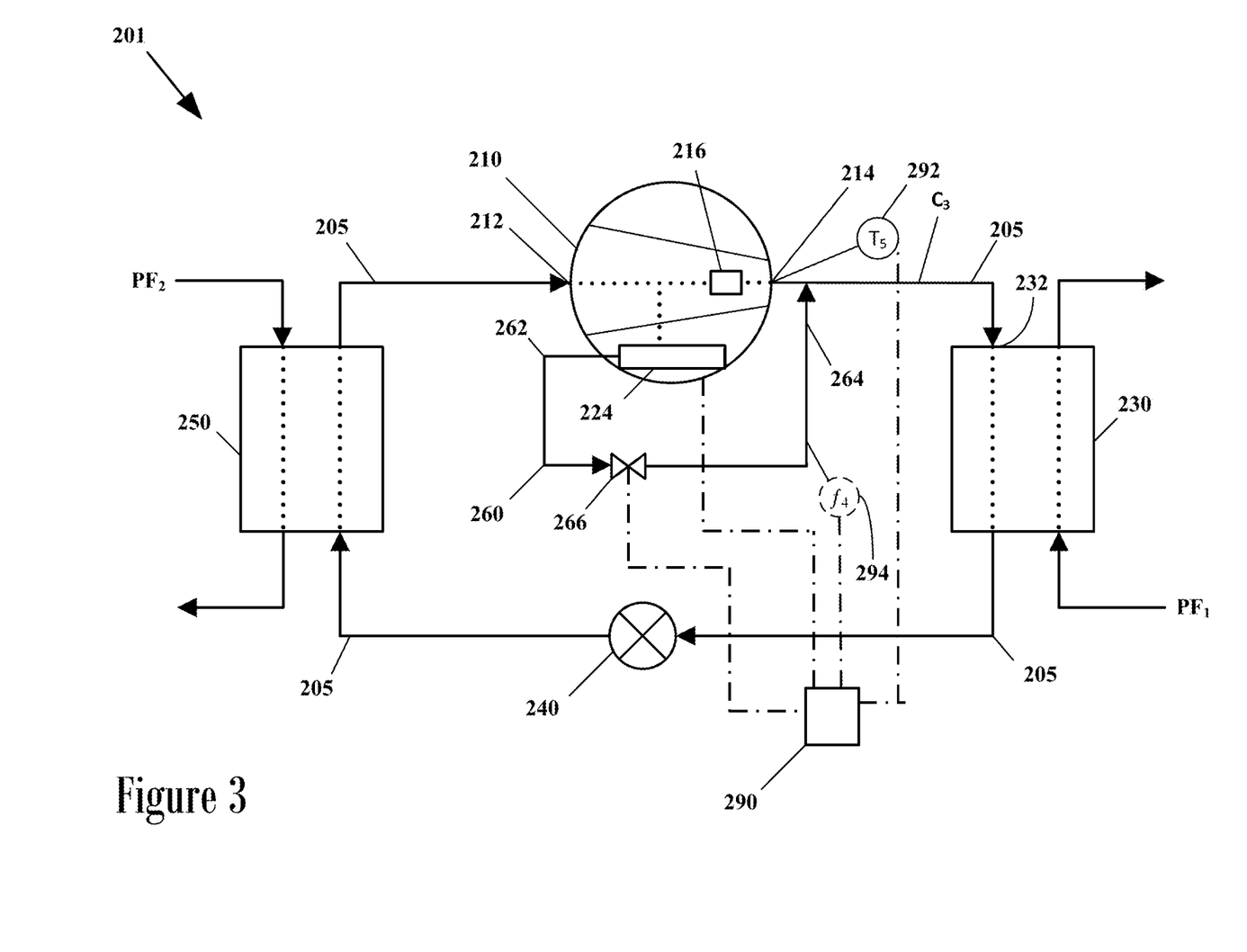
FIG. 3 is a schematic diagram of an embodiment of a heat transfer circuit.

FIG. 3 is a schematic diagram of a heat transfer circuit 201 according to an embodiment. In an embodiment, the heat transfer circuit 201 may be employed in an HVACR system. The heat transfer circuit 201 is similar to the heat transfer circuit 1 in FIG. 1, except with respect to the configuration of the additive stream 260. For example, the heat transfer circuit 201 includes a main flow path 205, a compressor 210 with a suction inlet 212, an outlet 214, a compression mechanism 216, and a sump 224; a condenser 230 with an inlet 232 for working fluid; an expansion device 240; and an evaporator 250. The condenser 230 utilizes a first process fluid $PF_1$ to cool working fluid flowing through the condenser 230, and the evaporator 250 utilizes the working fluid flowing through the evaporator 250 to cool a second process fluid $PF_2$ similar to the heat transfer circuit 1 in FIG. 1. As similarly discussed regarding the heat transfer circuit 1 in FIG. 1, the heat transfer circuit 201 in an embodiment may include additional components than those shown in FIG. 2.

As shown in FIG. 3, the additive stream 260 includes an inlet 262, an outlet 264, and a valve 266. In an embodiment, the inlet 262 of the additive stream 260 connects to the sump 224 of the compressor 110. Liquid is separated from the working fluid and flows from the sump 224 into inlet 262 of the additive stream 260. In an embodiment, the separated liquid may include lubricant that contains additive as discussed above with respect to the heat transfer circuit 1. Alternatively, the heat transfer circuit 201 may be oil-free and the separated liquid may contain liquid additive as similarly discussed above with respect to the heat transfer circuit 1. In such an embodiment, the additive may have a composition as discussed above.

In FIG. 3, the additive stream 260 has an inlet 262 connected to the sump 224 of the compressor 210. However, as similarly discussed above with respect to the heat transfer circuit 1 in FIG. 1, separation of the liquid for the additive stream 260 may occur in a different component in the main flow path 205 (e.g., the evaporator 250, an optional separator, etc.) in an embodiment. As similarly discussed above with respect to the additive stream 60 in FIG. 1, the additive stream 260 in an embodiment may have its inlet 262 connected to the evaporator 250 or a separator (e.g., separator 80 in FIG. 1) located after the expansion device 240 and before the compressor 210 in the main flow path 205. In such embodiments, lubricant containing additive or additive flows into the lubricant stream 260 from the evaporator 250 or the separator.

The additive stream 260 supplies additive to the main flow path 205 in the heat transfer circuit 201. The additive stream 260 is configured to control a concentration of additive $C_3$ in the working fluid flowing through the main flow path 205 as similarly discussed above with respect to the additive stream 60 in FIG. 1. In an embodiment, the concentration of additive $C_3$ in the working fluid is the concentration of additive $C_3$ in the working fluid entering the inlet 232 of the condenser 230.

As shown in FIG. 3, the outlet 264 of the additive stream 260 is connected to the main flow path 205 after the compressor 210 and before the condenser 230. The additive stream 260 is configured to supply a flowrate of liquid including the additive $f_4$ containing additive to the main flow path 105. The flowrate of liquid including the additive $f_4$ is supplied to the working fluid in the main flow path 205 after being discharged from the compressor 210 and before entering the condenser 230. The working fluid discharged from the compressor 210 has a discharge temperature $T_5$. In an embodiment, the flowrate of liquid including the additive $f_4$ supplied from the additive stream 260 is based on a discharge temperature $T_5$ of the working fluid from the compressor 210 as similarly discussed above regarding the flowrate of liquid including the flowrate of liquid including the additive $f_1$ in FIG. 1. In an embodiment, the working fluid flowing through the heat transfer circuit 201 may have a similar composition as discussed above with respect to the heat transfer circuit 1 in FIG. 1.

In an embodiment, the additive stream 260 includes a valve 266 configured to control the flowrate of liquid including the additive $f_4$ supplied from the outlet 264 of the additive stream 260. In an embodiment, the valve 266 may be a throttling valve. In an embodiment, the additive stream 260 may include other components than those shown in FIG. 3. In an embodiment, the additive stream 260 may include additional components (e.g., a pump, or the like) and/or connections to help pressurize the additive stream 260 for supplying the flowrate of liquid including the additive $f_4$ to the main flow path 205 after the compressor 210.

The heat transfer circuit 201 includes a controller 290. In an embodiment, the controller 290 is the controller of the HVACR system that includes the heat transfer circuit 201. In an embodiment, the controller 290 is electrically connected to compressor 210 and controls operation of the compressor 210. In an embodiment, the controller 290 is connected to the valve 266, a temperature sensor 292 that detects the discharge temperature $T_5$, and an optional flow sensor 294 that detects the flowrate of liquid including the additive $f_4$. In an embodiment, the controller 290 may control the flowrate of liquid including the additive $f_4$ from the additive stream 260 based on the discharge temperature $T_5$ as similarly discussed above with respect to the additive stream 60 in FIG. 1.

Figure 4:
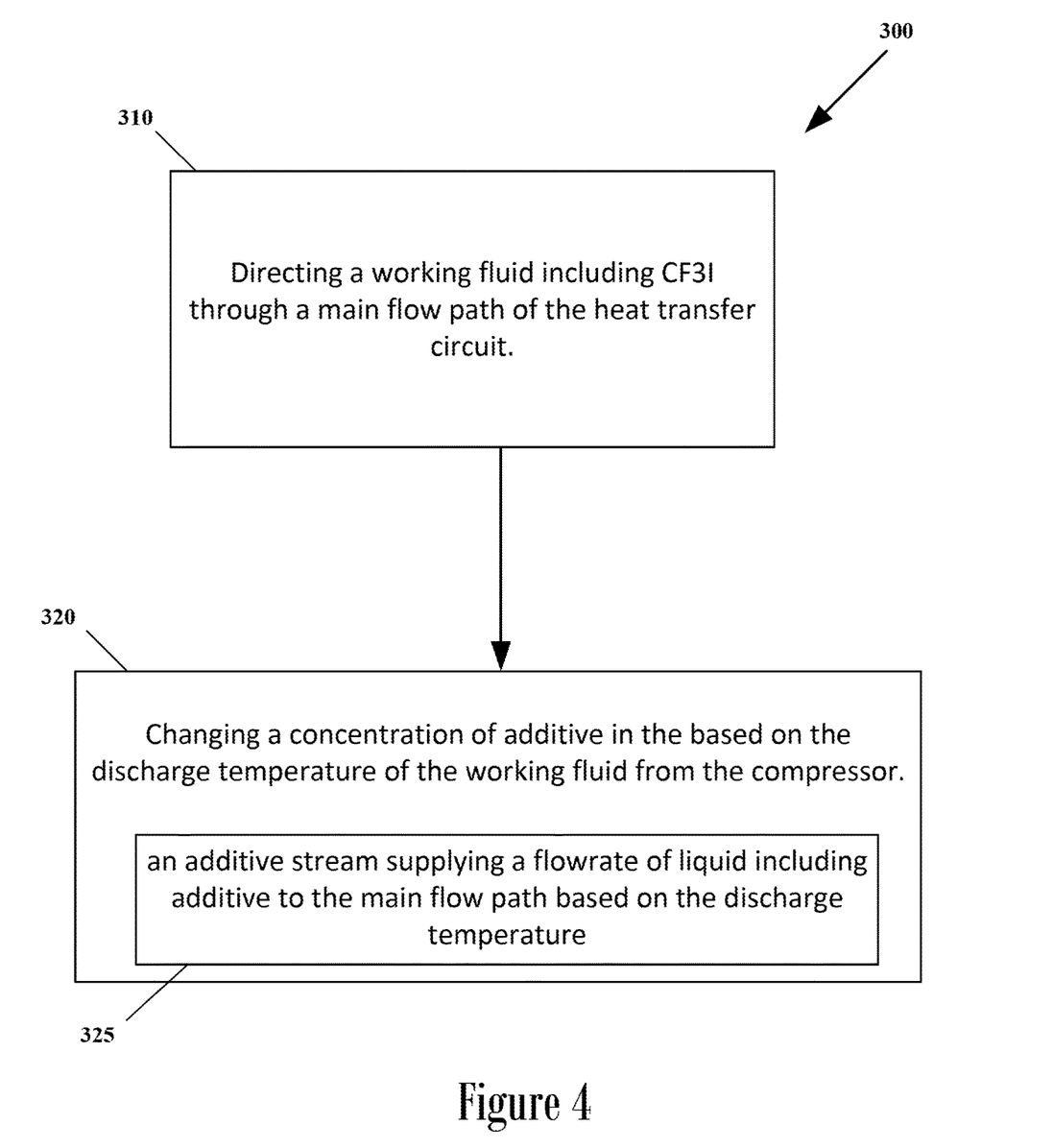
FIG. 4 is a block diagram of a method for operating a heat transfer circuit.

FIG. 4 is a block diagram of a method 300 for operating a heat transfer circuit. For example, the method 300 may be for operating the heat transfer circuit 1 in FIG. 1, the heat transfer circuit 101 in FIG. 2, or the heat transfer circuit 201 in FIG. 3. In an embodiment, the heat transfer circuit is employed in an HVACR circuit. The method 300 starts at 310.

At 310, working fluid including $CF_3I$ is directed through a main flow path (e.g., main flow path 5, 105, 205) of the heat transfer circuit (e.g., heat transfer circuit 1, 101, 201). In an embodiment, heat transfer circuit includes a compressor (e.g., compressor 10, 110, 210), a condenser (e.g., condenser 30, 130, 230), an expander (e.g., expansion device 40, 140, 240), and an evaporator (e.g., evaporator 50, 150, 250). In an embodiment, the main flow path extends through the compressor, the condenser, the expander, the evaporator, and back to the compressor.

In an embodiment, directing the working fluid through the main flow path 310 may include compressing the working fluid in a compressor, cooling the compressed working fluid in the condenser with a first process fluid (e.g., first process fluid $PF_1$), expanding the cooled working fluid in the expander, and cooling a second process fluid (e.g., second process fluid $PF_2$) in an evaporator with the expanded working fluid. The method 300 then proceeds to 320.

At 320, a concentration of additive in the working fluid entering the condenser (e.g., concentration of additive $C_1$, $C_2$, $C_3$) is changed based on a discharge temperature of the working fluid from the compressor (e.g., discharge temperature $T_1$, $T_4$, $T_5$). The additive includes at least one of a radical stabilizer and a radical scavenger for $CF_3I$. Radical stabilizers and radical scavengers for $CF_3I$ may be the same as discussed above with respect to the heat transfer circuit 1 in FIG. 1. In an embodiment, liquid lubricant contains additive as similarly discussed above with respect to the heat transfer circuit 1 in FIG. 1. In an embodiment, liquid In an embodiment, changing the concentration of additive in the working fluid entering the condenser 310 includes increasing the concentration of additive when the discharge temperature reaches a predetermined temperature. In an embodiment, the concentration of additive in the working fluid is at or about constant when the discharge temperature is below a predetermined temperature. In an embodiment, the predetermined temperature is less than 90° C. and greater than 50° C. In an embodiment, the predetermined temperature is at or about 80° C. or less than 80° C. In an embodiment, the predetermined temperature is at or about 60° C. or greater than 60° C. In an embodiment, the predetermined temperature is from at or about 60° C. to at or about 80° C. In an embodiment, the predetermined temperature is from at or about 60° C. to at or about 70° C.

In an embodiment, changing the concentration of additive in the working fluid entering the condenser 320 includes an additive stream (e.g., additive stream 60, 160, 260) supplying a flowrate of liquid including additive (e.g., flowrate $f_1$, $f_3$, $f_4$) to the working fluid in the main flow path based on the discharge temperature 325. In an embodiment, the additive stream adds a flowrate of additive to the working fluid in the main flow path based on the desired concentration for the concentration of the additive in the working fluid entering the condenser. In an embodiment, flowrate of additive supplied by the additive stream is liquid lubricant containing dissolved additive. The desired concentration of additive can be the same as discussed above with respect to the heat transfer circuit 1 in FIG. 1. In an embodiment, flowrate may be at or about zero when the discharge temperature is below the predetermined temperature.

In an embodiment, the method 300 may be modified based on the heat transfer circuit 1, the heat transfer circuit 101, and/or the heat transfer circuit 201 as shown in FIGS. 1-3 and/or as described above. For example, the method 300 in an embodiment may include separating the additive for the additive stream from the working fluid in the main flow path with the evaporator, with the compressor, and/or with a separator (e.g., separator 80) located after the expander and before the compressor in the main flow path.

Aspects:

Any of aspects 1-10 can be combined with any of aspects 11-19.

Aspect 1. A heat transfer circuit, comprising:
a compressor to compress a working fluid, the working fluid including $CF_3I$,
a condenser to cool the working fluid with a first process fluid,
an expander to expand the working fluid;
an evaporator to heat the working fluid with a second process fluid;
a main flow path of the working fluid extending through the compressor, the condenser, the expander, the evaporator, and back to the compressor; and
an additive stream having an outlet configured to supply additive to the working fluid in the main flow path at the compressor or after the compressor and before the condenser based on a discharge temperature of the working fluid from the compressor, the additive including at least one of a radical reaction stabilizer for $CF_3I$ and a radical scavenger for $CF_3I$.

Aspect 2. The heat transfer circuit of aspect 1, wherein the additive stream is configured to increase a concentration of the additive in the working fluid entering the condenser based on the discharge temperature increasing.

Aspect 3. The heat transfer circuit of either one of aspects 1 or 2, a total concentration of the one or more radical reaction stabilizers in the working fluid entering the condenser is from at or about 0.00003% to at or about 0.015% by volume.

Aspect 4. The heat transfer circuit of any one of aspects 1-3, a total concentration of the one or more radical scavengers in the working fluid entering the condenser is from at or about 0.000003% to at or about 0.01% by volume.

Aspect 5. The heat transfer circuit of any one of aspects 1-4, wherein
the compression includes a compression mechanism that is rotated or orbited to compress the working fluid, and
the outlet is connected to the main flow path at the compression mechanism of the compressor, or after the compression mechanism and before the condenser in the main flow path.

Aspect 6. The heat transfer circuit of any one of aspects 1-5, wherein the additive stream includes an inlet connected to at least one of a sump of the compressor, the evaporator, and a separator located after the expander and before the compressor in the main flow path.

Aspect 7. The heat transfer circuit of any one of aspects 1-6, wherein a flowrate of the additive supplied to the working fluid in the main flow path is at or about constant when the discharge temperature is below a predetermined temperature.

Aspect 8. The heat transfer circuit of aspect 7, wherein the flowrate of the additive is at or about zero when the discharge temperature is below the predetermined temperature.

Aspect 9. The heat transfer circuit of any one of aspects 1-8, wherein the additive includes the radical reaction stabilizer for $CF_3I$, the radical reaction stabilizer being one or more of a triaryl phosphate and a triaryl amine.

Aspect 10. The heat transfer circuit of any one of aspects 1-9, wherein the radical reaction stabilizer is one of trinaphthyl phosphate and trinapthyl amine.

Aspect 11. A method for operating a heat transfer circuit, the heat transfer circuit including a compressor, a condenser, an expander, and an evaporator, the method comprising:
directing a working fluid including $CF_3I$ through a main flow path of the heat transfer circuit, the main flow path extending through the compressor, the condenser, the expander, the evaporator and back to the compressor;
changing a concentration of additive in the working fluid entering the condenser based on a discharge temperature of the working fluid from the compressor, the additive including at least one of a radical reaction stabilizer for $CF_3I$ and a radical scavenger for $CF_3I$.

Aspect 12. The method of aspect 11, wherein a total concentration of the one or more radical reaction stabilizers in the working fluid entering the condenser is from at or about 0.00003% to at or about 0.015% by volume.

Aspect 13. The method of either one of aspects 11 or 12, wherein a total concentration of the one or more radical scavengers in the working fluid entering the condenser is from at or about 0.000003% to at or about 0.01% by volume.

Aspect 14. The method of any one of aspects 11-13, wherein changing the concentration of additive in the working fluid entering the condenser includes:
an additive stream supplying a flowrate of the additive to the main flow path based on the discharge temperature.

Aspect 15. The method of aspect 14, wherein the flowrate of the additive is at or about constant when the discharge temperature is below a predetermined temperature.

Aspect 16. The method of aspect 15, wherein the flowrate of the additive is at or about zero when the discharge temperature is below a predetermined temperature.

Aspect 17. The method of either one of aspects 15 or 16, wherein the predetermined temperature is from at or about 60° C. to at or about 90° C.

Aspect 18. The method of any one of aspects 11-17, wherein the additive includes the radical reaction stabilizer for $CF_3I$, the radical reaction stabilizer being one or more of a triaryl phosphate and a triaryl amine.

Aspect 19. The method of any one of aspects 11-18, wherein the radical reaction stabilizer is one of trinaphthyl phosphate and trinapthyl amine.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A heat transfer circuit, comprising:
a compressor to compress a working fluid, the working fluid including $CF_3I$;
a condenser to cool the working fluid with a first process fluid;
an expander to expand the working fluid;
an evaporator to heat the working fluid with a second process fluid;
a main flow path of the working fluid extending through the compressor, the condenser, the expander, the evaporator, and back to the compressor; and
an additive stream configured to supply additive to the working fluid in the main flow path at the compressor or after the compressor and before the condenser based on a discharge temperature of the working fluid from the compressor, the additive including at least one of a radical reaction stabilizer for $CF_3I$ and a radical scavenger for $CF_3I$.

2. The heat transfer circuit of claim 1, wherein the additive stream is configured to increase a concentration of the additive in the working fluid entering the condenser based on the discharge temperature increasing.

3. The heat transfer circuit of claim 1, wherein a total concentration of the one or more radical reaction stabilizers in the working fluid entering the condenser is from at or about 0.00003% to at or about 0.015% by volume.

4. The heat transfer circuit of claim 1, wherein a total concentration of the one or more radical scavengers in the working fluid entering the condenser is from at or about 0.000003% to at or about 0.01% by volume.

5. The heat transfer circuit of claim 1, wherein
the compressor includes a compression mechanism that is rotated or orbited to compress the working fluid, and
the additive stream is connected to the main flow path at the compression mechanism of the compressor, or after the compression mechanism and before the condenser in the main flow path.

6. The heat transfer circuit of claim 1, wherein the additive stream is configured to receive the additive from one or more locations in the main flow path that include a sump of the compressor, the evaporator, and a separator located after the expander and before the compressor in the main flow path.

7. The heat transfer circuit of claim 1, wherein a flowrate of the additive supplied by the additive stream to the working fluid in the main flow path is at or about constant when the discharge temperature is below a predetermined temperature.

8. The heat transfer circuit of claim 7, wherein the flowrate of the additive is at or about zero when the discharge temperature is below the predetermined temperature.

9. The heat transfer circuit of claim 1, wherein the additive includes the radical reaction stabilizer for $CF_3I$, the radical reaction stabilizer being one or more of a triaryl phosphate and a triaryl amine.

10. The heat transfer circuit of claim 9, wherein the radical reaction stabilizer is one of trinaphthyl phosphate and trinapthyl amine.

11. A method for operating a heat transfer circuit, the heat transfer circuit including a compressor, a condenser, an expander, and an evaporator, the method comprising:
    directing a working fluid including $CF_3I$ through a main flow path of the heat transfer circuit, the main flow path extending through the compressor, the condenser, the expander, the evaporator, and back to the compressor; and
    changing a concentration of additive in the working fluid entering the condenser based on a discharge temperature of the working fluid from the compressor, the additive including at least one of a radical reaction stabilizer for $CF_3I$ and a radical scavenger for $CF_3I$.

12. The method of claim 11, wherein a total concentration of the one or more radical reaction stabilizers in the working fluid entering the condenser is from at or about 0.00003% to at or about 0.015% by volume.

13. The method of claim 11, wherein a total concentration of the one or more radical scavengers in the working fluid entering the condenser is from at or about 0.000003% to at or about 0.01% by volume.

14. The method of claim 11, wherein the changing of the concentration of the additive in the working fluid entering the condenser includes:
    an additive stream supplying a flowrate of the additive to the main flow path based on the discharge temperature.

15. The method of claim 14, wherein the flowrate of the additive is at or about constant when the discharge temperature is below a predetermined temperature.

16. The method of claim 15, wherein the flowrate of the additive is at or about zero when the discharge temperature is below the predetermined temperature.

17. The method of claim 15, wherein the predetermined temperature is from at or about 60° C. to at or about 90° C.

18. The method of claim 11, wherein the additive includes the radical reaction stabilizer for $CF_3I$, the radical reaction stabilizer being one or more of a triaryl phosphate and a triaryl amine.

19. The method of claim 18, wherein the radical reaction stabilizer is one of trinaphthyl phosphate and trinapthyl amine.

* * * * *